United States Patent
Pinto

(10) Patent No.: US 11,753,146 B1
(45) Date of Patent: Sep. 12, 2023

(54) VTOL AIRCRAFT HAVING MODULAR PAYLOAD

(71) Applicant: Geoffrey P. Pinto, San Diego, CA (US)

(72) Inventor: Geoffrey P. Pinto, San Diego, CA (US)

(*) Notice: Subject to any disclaimer, the term of this patent is extended or adjusted under 35 U.S.C. 154(b) by 785 days.

(21) Appl. No.: 16/505,639

(22) Filed: Jul. 8, 2019

Related U.S. Application Data

(60) Provisional application No. 62/695,417, filed on Jul. 9, 2018.

(51) Int. Cl.
*B64C 17/02* (2006.01)
*B64C 29/00* (2006.01)

(52) U.S. Cl.
CPC .................. *B64C 17/02* (2013.01); *B64C 29/0033* (2013.01)

(58) Field of Classification Search
CPC .............. B64C 17/02; B64C 2211/00
USPC .......................................................... 244/93
See application file for complete search history.

(56) References Cited

U.S. PATENT DOCUMENTS

| | | | |
|---|---|---|---|
| 10,207,794 B1* | 2/2019 | Beckman et al. ......... G05D 3/00 |
| 11,040,768 B2* | 6/2021 | Bailly ................. B64C 39/024 |
| 2016/0304195 A1* | 10/2016 | Alber et al. ............ B64C 29/02 |
| 2017/0203843 A1* | 7/2017 | Chan et al. ............ B64D 9/003 |
| 2018/0086462 A1* | 3/2018 | Holzer .................... B64D 9/00 |
| 2018/0290725 A1* | 10/2018 | Koessler et al. ........ B64C 17/02 |
| 2018/0354617 A1* | 12/2018 | Frolov et al. ............. B60F 5/02 |
| 2019/0039721 A1* | 2/2019 | Liu et al. ................. B64F 5/50 |
| 2019/0047707 A1* | 2/2019 | Sopper et al. ........ B65D 77/225 |
| 2019/0144100 A1* | 5/2019 | Samir et al. .......... B64C 39/024 244/39 |
| 2019/0185162 A1* | 6/2019 | Prager et al. .......... G05D 1/101 |

(Continued)

FOREIGN PATENT DOCUMENTS

| | | | | |
|---|---|---|---|---|
| CA | 2994087 A1* | 9/2018 | .................... | B64C 1/26 |
| CN | 106828886 A * | 6/2017 | | |
| CN | 108238236 A * | 7/2018 | | |
| CN | 108248833 A * | 7/2018 | | |
| CN | 110077584 A * | 8/2019 | | |
| CN | 110217381 A * | 9/2019 | ................. | B64C 17/02 |
| CN | 112437740 A * | 3/2021 | ................. | B64C 17/02 |
| CN | 112722273 A * | 4/2021 | ................. | B64C 17/02 |
| EP | 3511242 A1* | 7/2019 | | |
| EP | 3594113 A1* | 1/2020 | ................. | B64C 17/02 |

(Continued)

*Primary Examiner* — Christopher P Ellis
(74) *Attorney, Agent, or Firm* — Charmasson, Buchaca & Leach, LLP

(57) ABSTRACT

A vertical take off and landing (VTOL) aircraft has a pair of fixed wings fore and aft, straddling a pair of tiltable propulsors, such as ducted fans. The aircraft includes a modular crew cabin or freight payload and a dynamic counterbalance positioning system which can shift the location of an integral aircraft segment which may contain operational components such as fuel tanks, batteries, avionics equipment etc. in order to move the aircraft center of gravity closer to the center of lift and/or vertical thrust.

8 Claims, 4 Drawing Sheets

(56) References Cited

U.S. PATENT DOCUMENTS

| | | | | |
|---|---|---|---|---|
| 2019/0210713 | A1* | 7/2019 | Yang et al. | B64U 30/10 |
| 2020/0031464 | A1* | 1/2020 | Shafir | B64C 27/28 |
| 2020/0307776 | A1* | 10/2020 | Coco et al. | B64F 5/50 |
| 2021/0061447 | A1* | 3/2021 | Heard et al. | B64C 17/08 |
| 2021/0061448 | A1* | 3/2021 | Heard et al. | B64C 27/04 |
| 2021/0107633 | A1* | 4/2021 | Kimchi et al. | B64C 25/52 |
| 2021/0300527 | A1* | 9/2021 | Thalheimer | B64C 29/0025 |
| 2021/0339860 | A1* | 11/2021 | Agostino et al. | B64U 10/25 |
| 2022/0041277 | A1* | 2/2022 | Tian | B64U 50/19 |
| 2022/0041280 | A1* | 2/2022 | Tian | B64C 29/0025 |
| 2022/0355932 | A1* | 11/2022 | Abramov et al. | B64D 5/00 |
| 2023/0077891 | A1* | 3/2023 | Schafer et al. | B64C 3/56 |

FOREIGN PATENT DOCUMENTS

| | | | | |
|---|---|---|---|---|
| EP | 3738871 | A1* | 11/2020 | B64C 1/063 |
| FR | 3083774 | A1* | 1/2020 | |
| GB | 2564777 | A * | 1/2019 | B64C 17/02 |
| JP | 2006142913 | A * | 6/2006 | |
| WO | 2010138033 | A1* | 12/2010 | B64C 17/02 |
| WO | 2017040493 | A1* | 3/2017 | B64C 11/46 |
| WO | 2018163171 | A1* | 9/2018 | B64C 17/02 |
| WO | 2019163524 | A1* | 8/2019 | B64C 17/02 |
| WO | 2020012996 | A1* | 1/2020 | B64C 17/02 |
| WO | 2020039435 | A1* | 2/2020 | B64C 17/00 |

* cited by examiner

VTOL AIRCRAFT HAVING MODULAR PAYLOAD

PRIOR APPLICATION

This application claims the benefit of U.S. Provisional Pat. Application Serial No. 62695417, filed 2018-07-09.

FIELD OF THE INVENTION

The instant invention relates to a Vertical Takeoff and Landing air vehicle that combines the range of a fixed wing aircraft with the vertical takeoff capabilities of a helicopter or multi-copter while enabling practical loading and offloading of modular cargo payloads in confined landing zones.

BACKGROUND

Vertical Take-Off and Landing (VTOL) aircraft such as helicopters and quadcopters are able to take off and land in small spaces however generally lack capability to practically load modular cargo in the field or fly relatively long distances. Conversely, conventional aircraft can fly great distances however lack the ability to take off and land vertically in confined places. In conventional multicopter configurations propulsors are arrayed around a payload located at the center of gravity. This forces the vehicle attempting to onload a payload to land directly over the payload posing many logistical problems.

The need presently exists for an optionally-manned VTOL air vehicle that can deliver and extract a payload from confined or unimproved locations while maximizing range. The present state of the art includes multicopter drones and tiltrotor aircraft. The former feature compact packaging however lack long range capability due to function by pure thrust-borne lift. The latter feature integral propulsion outboard of the primary aero surfaces that tilt in unison to a generally vertical position for thrust-borne flight such as the V-22 Osprey. Due to overall wingspan plus rotor diameter these aircraft lack a compact configuration to allow them to land in confined spaces such as urban environments or tree clearings.

Additionally, as with helicopters and fixed-wing aircraft it is desirable to place the optional operator at the front of the vehicle primarily for improved pilot visibility.

Finally, for cargo transport vehicles it is desirable from a logistics and vehicle packaging standpoint to place the cargo at the front of the vehicle reducing ground clearance required for cargo (un)loading and minimizing the weight of landing gear. This design allows the aircraft to land proximal to the payload and then taxi to and attach with the payload rather than having to effectively land on top of the payload as with present multicopter and tiltwing vehicles which locate the payload under the vehicle vertical center of thrust.

For a VTOL optionally loaded aircraft positioning the operator/payload at the front of the vehicle rather than generally at the centers of thrust and lift generates a unique problem if the aircraft is operated unloaded. In this condition the aircraft center-of-gravity (CG) shifts away from the center of thrust potentially creating an overturning moment that cannot be reacted by the VTOL propulsion system.

Therefore, there is a need for a VTOL aircraft which addresses some or all of the above identified inadequacies.

SUMMARY

The principal and secondary objects of the invention are to provide an improved VTOL aircraft. These and other objects are achieved by a VTOL aircraft having an adjustable CG.

In some embodiments there is provided a VTOL aircraft that can operate in confined spaces with the capability to position operators or payload forward of the aircraft CG.

In some embodiments there is provided a VTOL aircraft having a tandem wing design having two propulsors located at the approximate aircraft CG in order to achieve compact packaging and balanced VTOL thrust-borne flight.

In some embodiments there is provided a VTOL aircraft that can achieve longer flight endurance than current designs operating in a similar flight envelope.

In some embodiments the optional operator or payload are located forward of the vehicle CG.

In some embodiments the proposed design generally co-locates the propulsor center of thrust, aerodynamic center of lift and CG while minimizing wingspan by dividing wing area into a pair of tandem wings.

In some embodiments a segment of the overall weight of the aircraft is designed to translate along the vehicle longitudinal axis to relocate the CG generally under the center of thrust for VTOL flight.

In some embodiments the aft wing of the pair is located both above the chord line of the forward wing as well as propulsor horizontal flight centerline in order to alleviate detrimental effects of forward wing downwash and propulsor wash on the aft wing.

In some embodiments the payload is located below the forward wing in order to position the payload as close to the VTOL center of thrust as well as aerodynamic center of lift as possible while still maintaining front-load functionality.

In some embodiments a substantial portion of the vehicle mass is positioned away from the aircraft center of lift and able to selectively translate forward and aft along the longitudinal axis of the vehicle to serve as a counterbalance to the presence or absence of a payload or weight variance thereof.

In some embodiments candidate components that may comprise this counterbalancing weight are electrical generators, fuel tanks, batteries or other components that do not affect the aerodynamic performance of the aircraft yet constitute a considerable portion of the overall vehicle weight.

In some embodiments positioning of this balancing mass may be accomplished via the avionics suite, a simple dedicated controller sensing vehicle weight and balance on the ground via load cells within the landing gear or by manual operation in conjunction with a simple trim table.

In some embodiments there is provided that in a vertical takeoff and landing vehicle that contains a fuselage structure and at least one propulsor, an improvement that comprises: a detachable payload having a center of mass offset from the vehicle center of gravity.

In some embodiments said detachable payload is counterbalanced by a countermass located on the opposite side of the aircraft center of gravity from said payload, and wherein said countermass is selectively-positionable.

In some embodiments the vehicle further comprises at least one aerodynamic lifting surface offset forward or aft from said vehicle center of gravity.

In some embodiments said detachable payload has a mass that is at least 10% of a dead weight of said vehicle and said detachable payload combined.

In some embodiments said detachable payload comprises a crew cabin; and wherein said crew cabin is located forward of the vehicle center of vertical thrust.

In some embodiments said detachable payload is located forward of the vehicle center of vertical thrust.

In some embodiments the vehicle comprises at least a pair of tandem wings generally co-locating the vehicle center of lift and center of gravity.

In some embodiments said countermass comprises components integral to the function of the vehicle; and, wherein said countermass is carried on a carriage moveable along a track between a forward position on said aircraft and an aft position on said aircraft.

In some embodiments there is provided a VTOL aircraft which comprises: a dynamic load distribution system which comprises: a weight distribution detector; a motor; a microprocessor; a carriage movable, through operation of said motor, along a track between a forward position on said aircraft and an aft position on said aircraft; a microprocessor responsive to said weight distribution detector; and, said microprocessor being programmed to control said motor in response to an output of said weight distribution detector.

In some embodiments said VTOL aircraft further comprises: a landing gear; and, wherein said weight distribution detector comprises: at least one load sensor associated with said landing gear.

In some embodiments said VTOL aircraft further comprises: said track extending along a longitudinal dimension of said aircraft; and, wherein said forward position is forward from an aircraft center of gravity.

In some embodiments said carriage comprises a grouping of substantially permanent aircraft components.

In some embodiments said VTOL aircraft further comprises a flexible ribbon cable providing electrical signals between said substantially permanent aircraft components on said carriage and electronic components located apart from said load distribution system.

In some embodiments said carriage counterbalances a detachable payload.

In some embodiments said carriage residing in said forward position shifts an aircraft center of gravity forward; and said carriage residing in said aft position shifts said aircraft center of gravity aftward.

In some embodiments said VTOL aircraft further comprises a screw having an axis of rotation substantially parallel to said longitudinal axis, and said carriage comprises a nut axially fixed with respect to said carriage and axially movable along said screw in response to rotation of said screw; and wherein said motor drives rotation of said screw.

In some embodiments said VTOL aircraft further comprises a belt mechanically connected to said carriage and to a pulley wherein said motor drives rotation of said pulley thereby moving said carriage along said track.

In some embodiments there is provided a method for moving the center of gravity on a VTOL aircraft toward its center of vertical thrust, said method comprises: mounting a moveable carriage on a track running longitudinally between a forward position and an aft position on said aircraft; detecting a weight distribution on said VTOL aircraft; and, moving said carriage in response to said detecting to one of said positions which reduces the distance between the center of gravity and the center of vertical thrust.

In some embodiments said detecting comprises: measuring a plurality of load sensors associated with a landing gear of said VTOL aircraft; calculating a preliminary location of the center of gravity along a longitudinal axis of said VTOL aircraft; determining an optimum position of said carriage to minimize a distance between the center of gravity and the center of vertical thrust on said VTOL aircraft; and, moving said carriage to said optimum position.

In some embodiments there is provided said method further comprises: adjusting the forward/aft position of said carriage during flight in order to dampen aircraft pitching moments.

The original text of the original claims is incorporated herein by reference as describing features in some embodiments.

DESCRIPTION OF THE EXEMPLARY EMBODIMENTS

Figure 1:
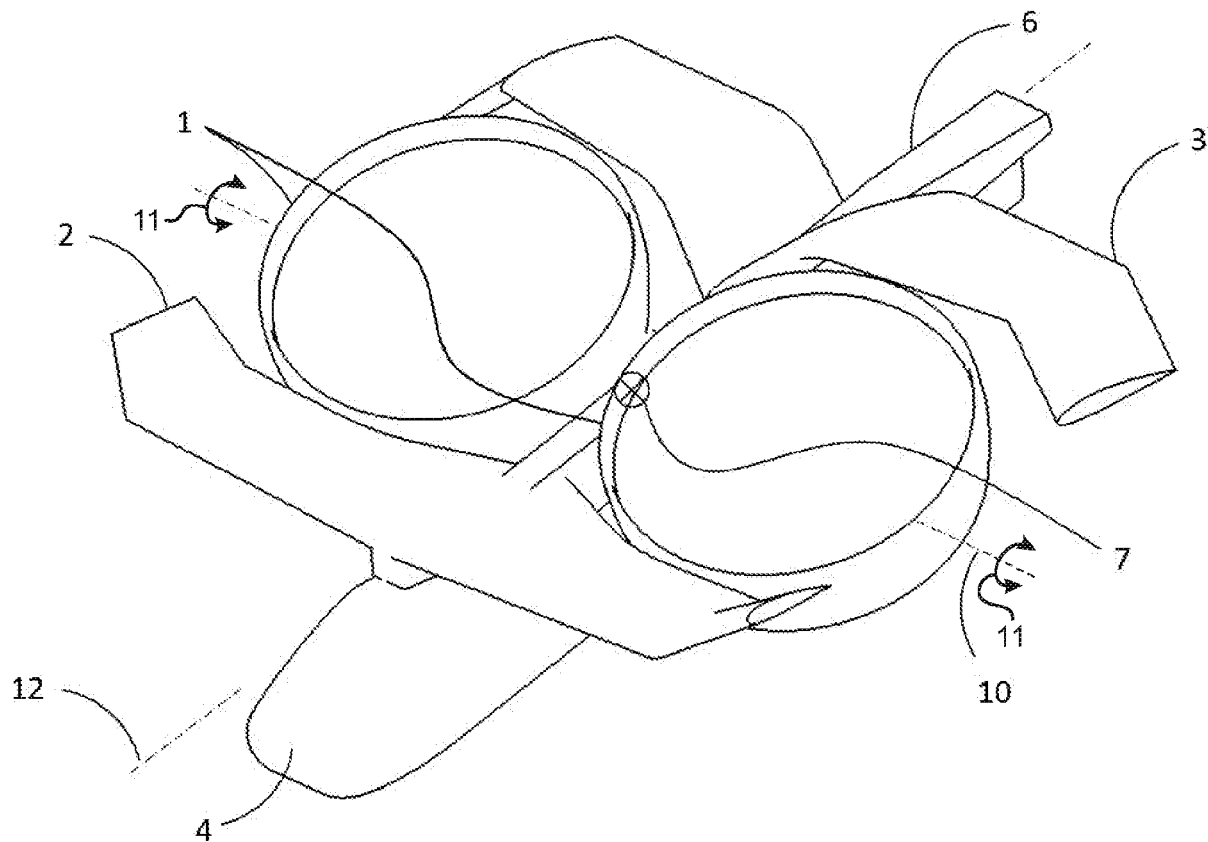
FIG. 1 is a diagrammatic perspective view of the concept aircraft.

Referring now to the drawing, there is shown in FIG. 1 a basic VTOL vehicle layout comprising of a pair of tandem wings 2,3 extending from a fuselage structure 6 and straddling a pair of propulsors 1, in this case ducted fans, which are dynamically orientable with respect to the fuselage structure, and laterally straddle the vehicle longitudinal axis 12 generally passing through or near the vehicle center of gravity 7.

In thrust-borne flight, where the propulsors are oriented in a generally vertical orientation, pitch control can be accomplished by tilting both propulsors in unison. Yaw control can be accomplished by differentially tilting both propulsors. Roll control can be accomplished by differential thrust between propulsors.

In wing-borne flight, where propulsors are tilted 11 about a lateral vehicle axis 10 to a generally horizontal orientation, roll control can be accomplished by differentially tilting both propulsors; and, yaw control can be accomplished by differential thrust between propulsors. For horizontal flight it may be necessary to include a control surface, such as an aileron, on either the fore or aft wing 2,3 or a dedicated rear stabilizer for pitch and/or yaw control or any combination thereof. However, the general concept allows for the potential to control as many aircraft degrees of freedom as possible via the rotationally articulated and variable thrust propulsors.

Figure 2:
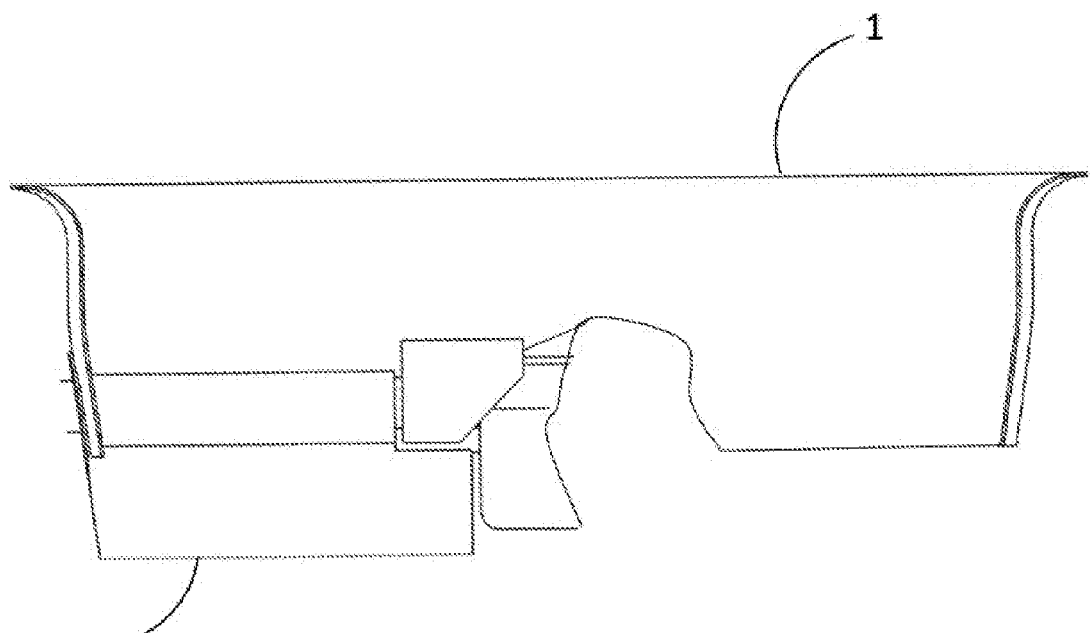
FIG. 2 is a diagrammatic cross-sectional side view of a propulsor including a control surface located in its exhaust plume taken along line 2-2 in FIG. 3.

As shown in FIG. 2, in order to minimize inertial moments it can be beneficial to replace pitch and yaw control via propulsor tilt with a dedicated control surface 13 located in the exhaust plume of each propulsor 1. Conversely, in lieu of the above control architecture, the same pitch-yaw-roll control can be accomplished using a swash plate rotor hub on each propulsor.

Figure 3:
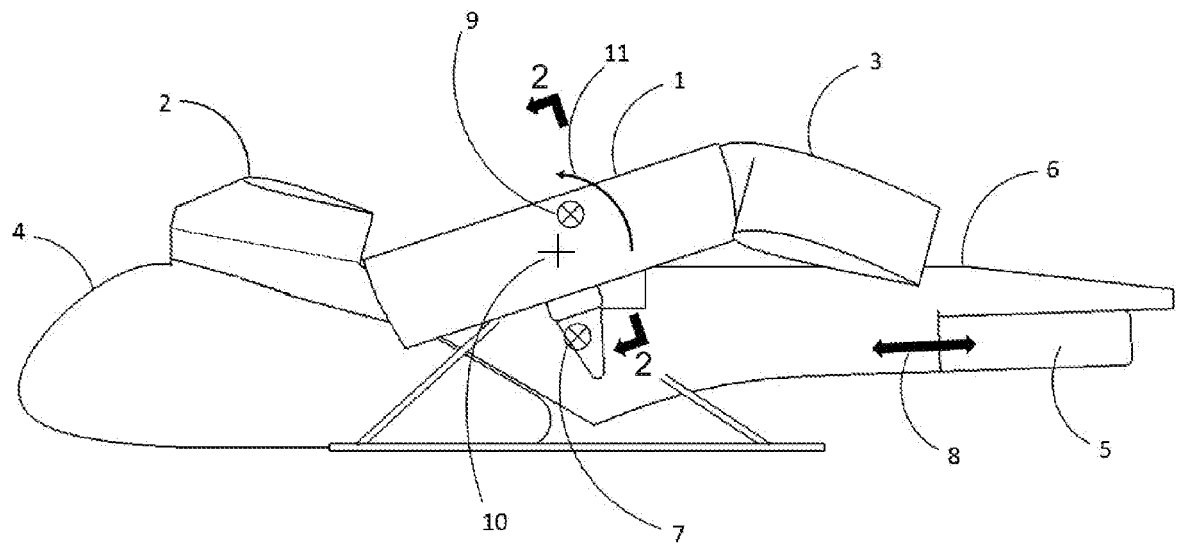
FIG. 3 is a diagrammatic side elevation view of the concept aircraft in the substantially thrust-borne flight configuration having a modular forward payload and aft dynamic vehicle balance system.
Figure 4:
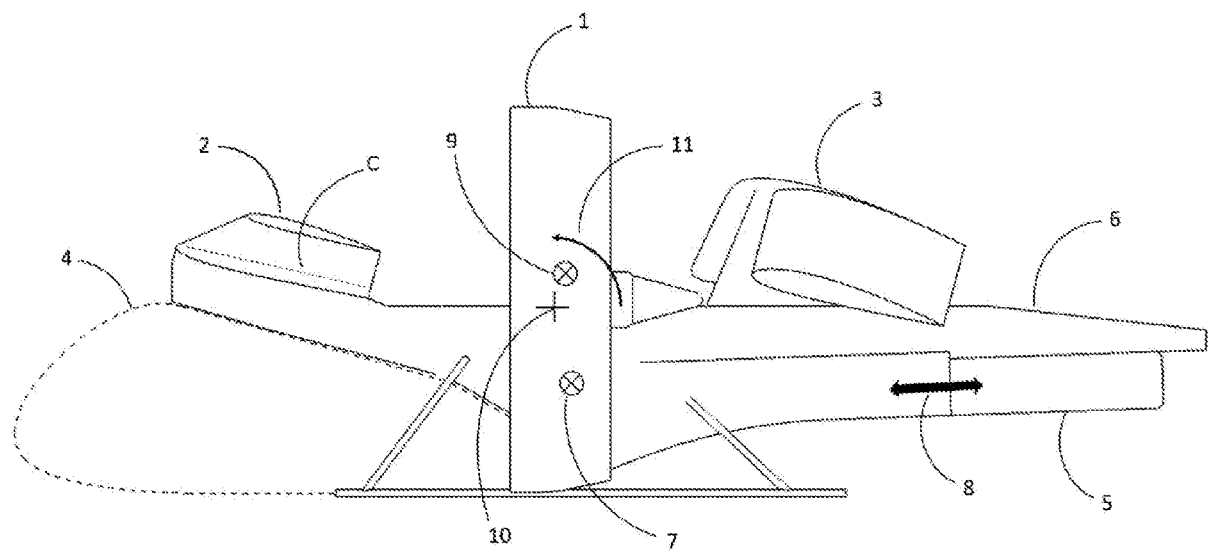
FIG. 4 is a diagrammatic side elevation view of the concept aircraft of FIG. 3 in the substantially wing-borne configuration.

Referring now to FIGS. 3 and 4, the aft wing 3 can be located generally above both the forward wing 2 chord line C and the propulsor pair 1 horizontally oriented exhaust centerline, which in this embodiment can intersect the lateral tilt axis 10, in order to minimize aerodynamic disturbances due to downwash and/or propulsor exhaust from either the forward wing or propulsors.

The optional operator or detachable modular payload 4 can be located generally forward of the propulsor pair 1, and may be located partially underneath the forward wing 2 in order to reduce the CG moment impact of the payload. This payload location being away from the center of gravity 7 is generally detrimental to aircraft performance. However, in FIG. 3 and FIG. 4 it is shown that the mass of the payload 4 can be countered by a selectively-positionable 8 translatable countermass 5 including native aircraft componentry such as an electric generator, fuel tanks, batteries or similar items integral to the function of the vehicle that can function as a counterbalance to the payload. When the aircraft is flown without a payload attached, the countermass can be selectively positioned closer to the propulsors 1 in order to balance the vehicle best for thrust-borne flight. Further, as the payload mass shifts or changes axial position, the countermass can be dynamically moved accordingly. This can be useful when the payload is a liquid such as water used in fire suppression vehicles.

Figure 5:
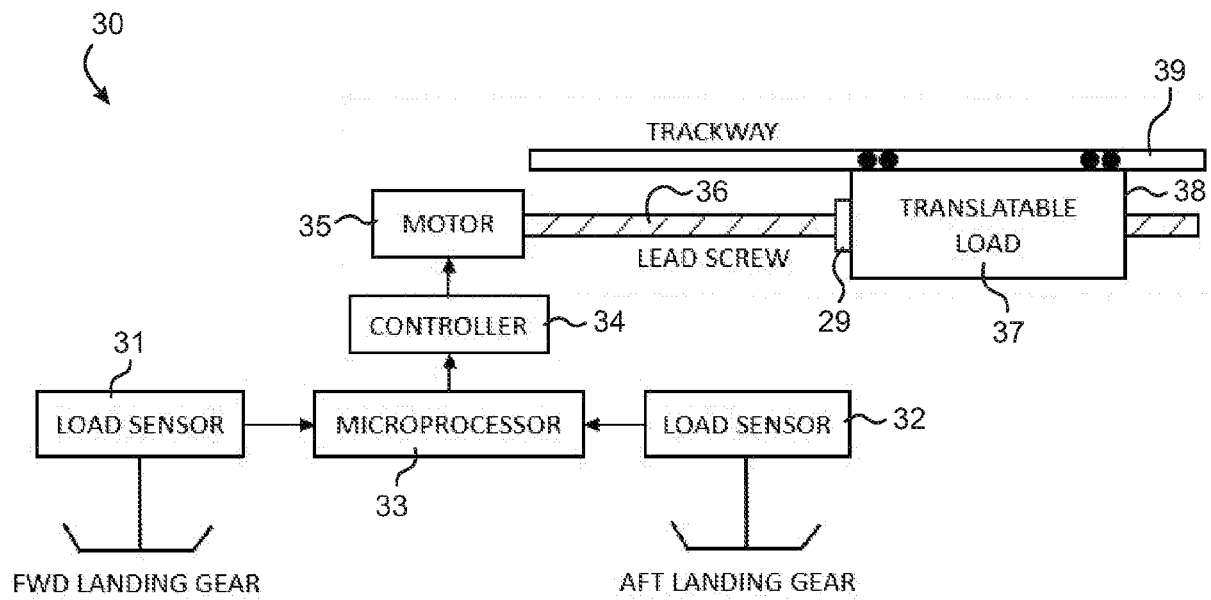
FIG. 5 is a diagrammatic schematic of the balance system designed to optimize CG for VTOL flight using a screw-based actuator.

FIG. 5 depicts a schematic of the selectively positionable countermass system 30 in the fully-autonomous configuration employing landing gear load sensors 31,32, a microprocessor 33, motor controller 34, and a motor 35 attached to a lead screw-type actuator 36 to determine and place the translatable load 37 at the optimum position for vehicle balance in VTOL flight. For example, the screw can have an axis of rotation substantially parallel to the longitudinal axis of the aircraft. The load can be carried on a translatable carriage 38 slidingly mounted to a trackway 39 that includes a nut 29 axially fixed with respect to the carriage and axially movable along the screw in response to rotation of the screw. Alternatively, this can be accomplished manually with the assistance of a flight manual weight and balance trim table.

Figure 6:
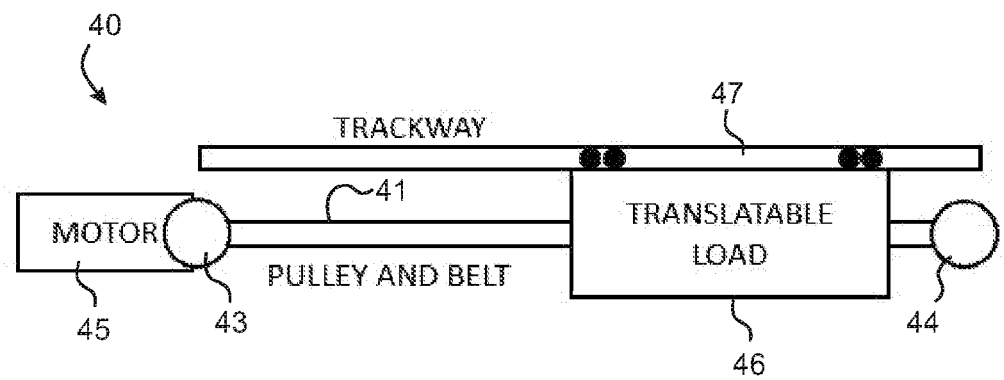
FIG. 6 is a diagrammatic schematic of the balance system designed to optimize CG for VTOL flight using a belt-based actuator.

FIG. 6 shows an alternate embodiment of the selectively positionable countermass system similar to the embodiment of FIG. 5. However, the nut and lead screw have been replaced by a pulley and belt-type actuator 40 which can use a belt 41 coursing over a pair of pulleys 43,44 driven by a motor 45 to translate a load-carrying carriage 46, mechanically connected to the belt, along a trackway 47.

Figure 7:
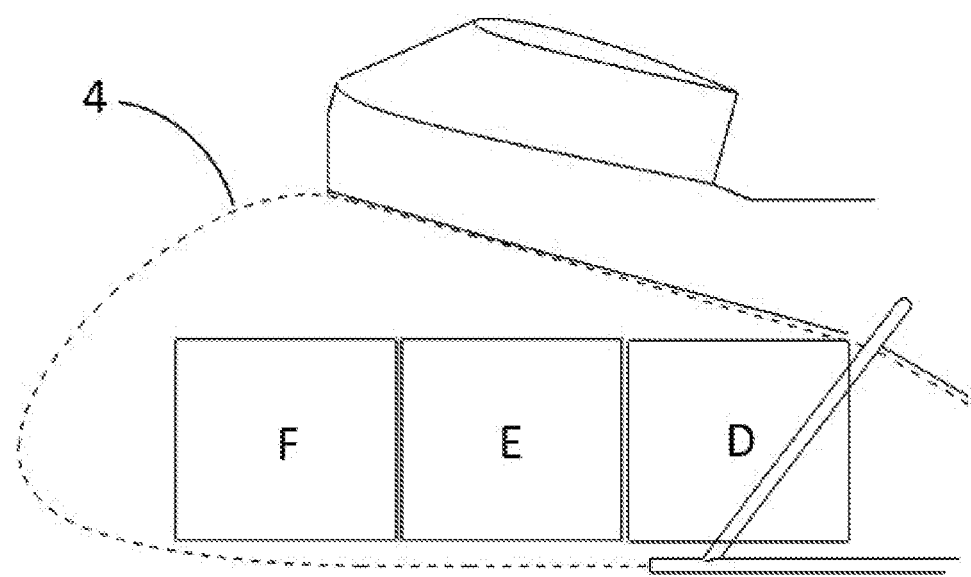
FIG. 7 is a diagrammatic partial side elevation view of the concept aircraft having a modular forward payload including multiple optional payload components.

FIG. 7 depicts a schematic of the order of loading of multiple optional payload components D, E, F which may be loaded onto the vehicle in that order and then offloaded at various landing sites in the reverse order in order to continually favor locating summed payload masses closer to the aircraft center of gravity 7.

While the preferred embodiments of the invention have been described, modifications can be made and other embodiments may be devised without departing from the spirit of the invention and the scope of the appended claims.

What is claimed is:

1. In a vertical takeoff and landing vehicle that contains a fuselage structure and at least one dynamically orientable propulsor, an improvement that comprises:
a detachable payload having a center of mass offset from the vehicle center of gravity.

2. The improvement of claim 1, wherein said detachable payload is counterbalanced by a countermass located on the opposite side of the aircraft center of gravity from said payload, and wherein said countermass is selectively-positionable.

3. The improvement of claim 2, which further comprises at least one aerodynamic lifting surface offset forward or aft from said vehicle center of gravity.

4. The improvement of claim 2, wherein said detachable payload has a mass that is at least 10% of a dead weight of said vehicle and said detachable payload combined.

5. The improvement of claim 2, wherein said detachable payload comprises a crew cabin; and wherein said crew cabin is located forward of the vehicle center of vertical thrust.

6. The improvement of claim 2, wherein said detachable payload is located forward of the vehicle center of vertical thrust.

7. The improvement of claim 2, wherein the vehicle comprises at least a pair of tandem wings generally co-locating the vehicle center of lift and center of gravity.

8. The improvement of claim 2, wherein said countermass comprises components integral to the function of the vehicle; and, wherein said countermass is carried on a carriage moveable along a track between a forward position on said aircraft and an aft position on said aircraft.

* * * * *